D. B. Ware,
Miter Box.
No. 106,894.   Patented Aug. 30. 1870.
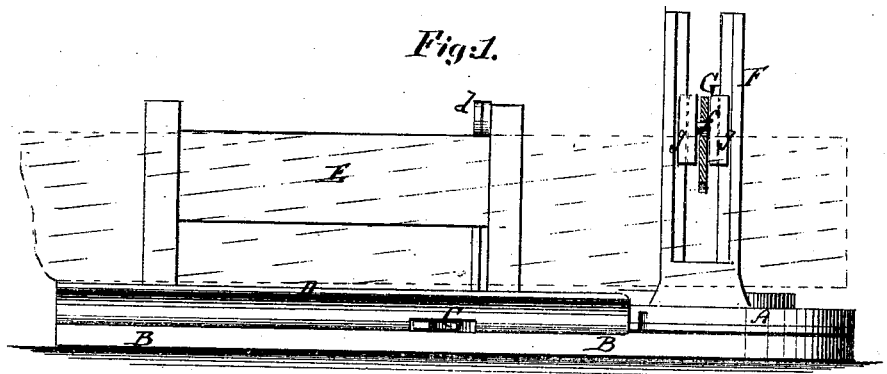
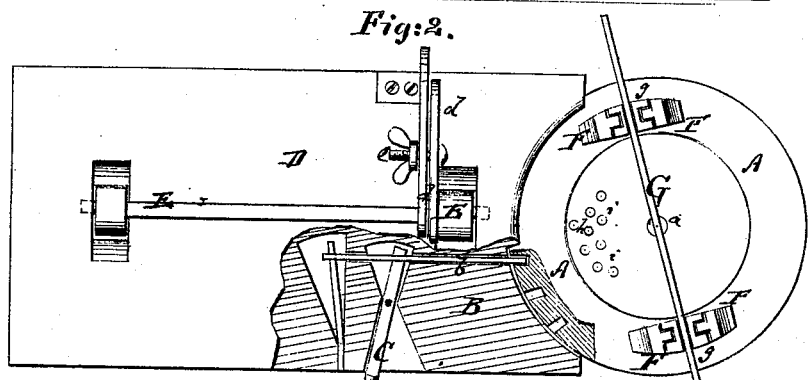
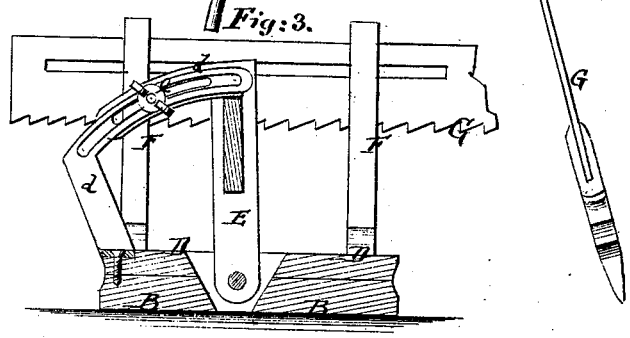
Witnesses:
Inventor:
D. B. Ware
per Munn & Co
Attorneys.

United States Patent Office.

DANIEL B. WARE, OF ATHENS, MICHIGAN.

Letters Patent No. 106,894, dated August 30, 1870.

IMPROVEMENT IN MITER-MACHINE.

The Schedule referred to in these Letters Patent and making part of the same

*To all whom it may concern:*

Be it known that I, DANIEL B. WARE, of Athens, in the county of Calhoun and State of Michigan, have invented a new and Improved Mitering-Machine; and I do hereby declare that the following is a full, clear, and exact description thereof, which will enable others skilled in the art to make and use the same, reference being had to the accompanying drawing forming part of this specification.

Figure 1 represents a side elevation of my improved mitering-machine.

Figure 2 is a plan or top view, partly in section, of the same.

Figure 3 is a vertical transverse section of the same.

Similar letters of reference indicate corresponding parts.

This invention relates to improvement in mitering-machines, and consists in the arrangement of the turn-table and locking device and the use of peculiar saw-guides, as hereinafter fully described.

A in the drawing represents the circular table of the machine.

It is, by a pin, $a$, pivoted to the bed B, near one end of the same.

The edge of the circular table has a series of notches, to receive the end of a spring catch, $b$, by means of which it is locked in any desired position.

The spring-catch $b$ is arranged upon the bed B, and connected with a lever, C, by means of which it can be withdrawn from the table.

Upon the bed B is fastened a cover, D, which covers the aforesaid catch and lever, and which, at the end, is cut under to overlap the contiguous edge of the disk A.

This cover serves to keep the sawdust from the machinery, and from clogging the several joints, &c.

The guide-frame E, for the stuff to be mitered, is pivoted to the bed or cover, so that it can be laterally inclined, to give any desired pitch to the cut.

The degree of inclination is regulated by two slotted curved plates, $d$, and a pin or screw, $e$.

From the table A project slotted standards F F, which serve as fixed guides for the saw G.

The saw is longitudinally slotted, as shown in fig. 3, and is suspended by pins $f f$, which are formed in movable guides $g$, that work up and down in the standards F.

The saw works back and forth on the pins $f$, while the guides $g$ work vertically in the standards.

By turning and locking the table A, the saw can be brought to cut at any desired angle.

In the disk A may be small apertures $i\ i$, to receive a pin, $h$, which serves as a guide for the material to be cut.

Having thus described my invention,

I claim as new and desire to secure by Letters Patent—

1. The turn-table A, secured to the bed D, in connection with the catch $b$ and lever C, substantially as herein shown and described.

2. The vertical guides $g$, arranged in the slotted standards F, and provided with the pins $f$, for holding the slotted saw G, substantially as herein shown and described.

DANIEL B. WARE.

Witnesses:
SAMUEL I. WINTON,
JOSEPH WINTON.